(No Model.)

C. R. JAMES.
SHAFT COUPLING.

No. 315,791. Patented Apr. 14, 1885.

WITNESSES:

INVENTOR
Christopher R James

UNITED STATES PATENT OFFICE.

CHRISTOPHER R. JAMES, OF JERSEY CITY, NEW JERSEY.

SHAFT-COUPLING.

SPECIFICATION forming part of Letters Patent No. 315,791, dated April 14, 1885.

Application filed January 26, 1885. (No model.)

*To all whom it may concern:*

Be it known that I, CHRISTOPHER R. JAMES, of Jersey City, in the county of Hudson and State of New Jersey, have invented a new and Improved Coupling for Shafting, known as a "Sleeve-Coupling;" and I hereby declare the following to be a full, clear, and exact description thereof, reference being had to the accompanying drawings, making part of this specification, in which—

Figure 1:
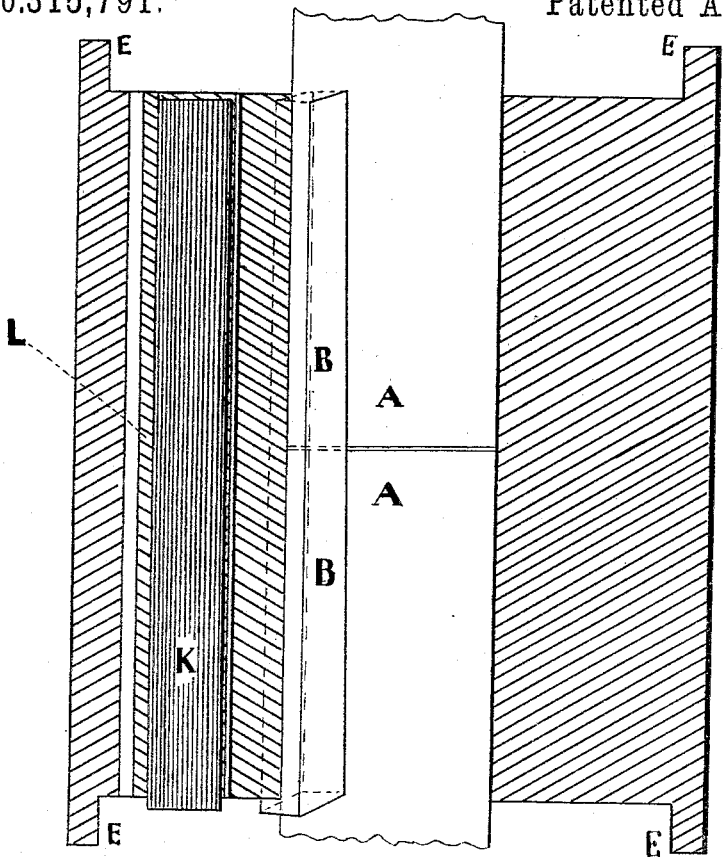
Figure 2:
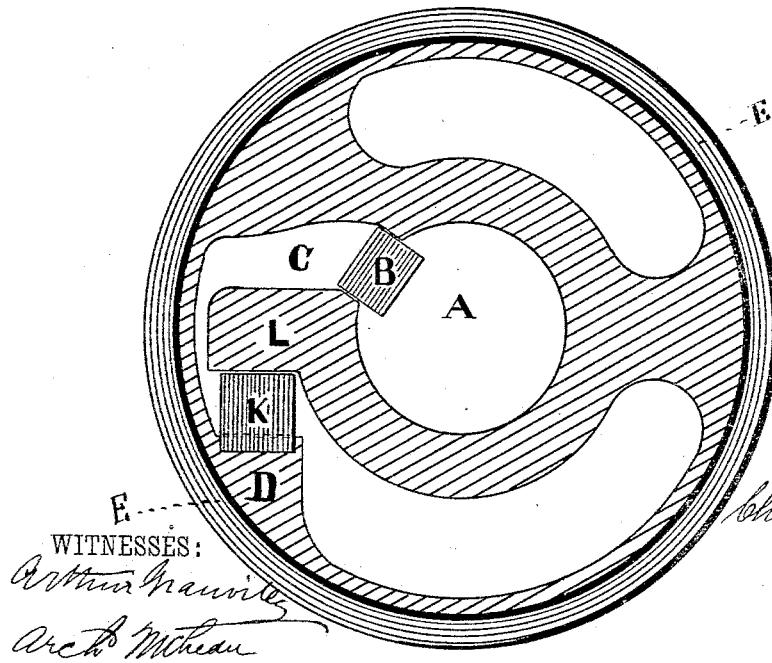

Figure 1 is a sectional view of the coupling with the ends of two shafts in position as held by said coupling, and Fig. 2 is a plan of the same.

Heretofore couplings of this nature were constructed with loose and separate caps and fastened to the coupling with bolts and with keys drawn and held in position with screws provided with nuts and other similar devices. In my improved coupling I dispense with loose caps and screwed keys and nuts.

In order that those skilled in the art may make and use my invention, I will proceed to describe the manner in which I have carried it out.

I provide my coupling with a slot, C, and a solid abutment, D, on the interior of the rim E of the coupling. This abutment is provided for the purpose of forming a backing or rest for the key K, which is fitted into its slot, and it will be seen that said key K impinges on the solid abutment D, and likewise presses upon the lip L of the coupling. Now, by driving the key K to its proper destination, it will so press upon the lip L of the coupling, which is flexible, as to cause it to grip the shafts A A, which are prevented from turning in said coupling by keys B B.

Having thus described my invention, what I claim as new, and desire to secure by Letters Patent, is—

1. A sleeve-coupling made with slots and abutments, substantially as shown and described.

2. A coupling having slots for keys, and with keys securing the ends of two shafts, all substantially as shown and described.

CHRISTOPHER R. JAMES.

Witnesses:
 ARCHIBALD MCLEAN,
 H. L. TURNER.